(12) United States Patent
Stevenson et al.

(10) Patent No.: US 11,027,719 B2
(45) Date of Patent: Jun. 8, 2021

(54) DISTRIBUTED POWER GENERATION FOR A VEHICLE SYSTEM

(71) Applicant: General Electric Company, Schenectady, NY (US)

(72) Inventors: Christian Xavier Stevenson, Blanchester, OH (US); Brandon Wayne Miller, Liberty Township, OH (US); Christopher James Kroger, West Chester, OH (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 77 days.

(21) Appl. No.: 16/207,604

(22) Filed: Dec. 3, 2018

(65) Prior Publication Data

US 2020/0172079 A1 Jun. 4, 2020

(51) Int. Cl.
*B60W 10/08* (2006.01)
*H02P 9/14* (2006.01)
*B60L 53/65* (2019.01)

(52) U.S. Cl.
CPC ............. *B60W 10/08* (2013.01); *B60L 53/65* (2019.02); *H02P 9/14* (2013.01)

(58) Field of Classification Search
CPC ..... H02J 2310/44; B60W 10/08; B60L 53/65; H02P 9/14
USPC .......................................... 700/286; 307/44
See application file for complete search history.

(56) References Cited

U.S. PATENT DOCUMENTS

| | | | |
|---|---|---|---|
| 2,269,332 A | 1/1942 | Bench et al. | |
| 2,431,687 A | 12/1947 | Drake | |
| 5,152,141 A | 10/1992 | Rumford et al. | |
| 5,285,626 A | 2/1994 | Leeson | |
| 5,480,107 A | 1/1996 | Bacon | |
| 6,625,504 B2 | 9/2003 | Landreth | |
| 6,777,822 B1 | 8/2004 | Suttie et al. | |
| 6,881,027 B2 | 4/2005 | Klaass et al. | |
| 7,251,942 B2 | 8/2007 | Dittmar et al. | |
| 7,367,193 B1 | 5/2008 | Thompson | |
| 7,482,709 B2 * | 1/2009 | Berenger | H02J 1/10 307/45 |
| 7,707,838 B2 | 5/2010 | Sheldon et al. | |
| 7,725,236 B2 | 5/2010 | Delaloye et al. | |
| 7,748,209 B1 | 7/2010 | Schopf et al. | |
| 7,936,086 B2 | 5/2011 | Yue et al. | |
| 8,261,527 B1 | 9/2012 | Stearns et al. | |
| 8,302,403 B2 | 11/2012 | Engle et al. | |
| 8,310,076 B2 | 11/2012 | Jones et al. | |
| 8,487,557 B2 | 7/2013 | Runkle | |
| 8,622,342 B2 | 1/2014 | Filho | |
| 8,657,227 B1 | 2/2014 | Bayliss et al. | |
| 8,927,905 B1 | 1/2015 | Sunday | |
| 9,267,437 B2 | 2/2016 | Perry et al. | |

(Continued)

*Primary Examiner* — Chun Cao
(74) *Attorney, Agent, or Firm* — Dority & Manning, P.A.

(57) ABSTRACT

A method and system for distributed power generation is provided. The method includes determining an operational cycle for the system; determining an average energy requirement of the system based on the operational cycle; configuring a plurality of energy sources each corresponding to the load device to produce a peak efficiency corresponding to the average energy requirement of the system; and coupling the energy source to provide energy to the load device.

20 Claims, 6 Drawing Sheets

(56) References Cited

U.S. PATENT DOCUMENTS

| | | |
|---|---|---|
| 9,267,438 B2 | 2/2016 | Dooley et al. |
| 9,303,566 B2 | 4/2016 | Haillot |
| 9,366,182 B2 | 6/2016 | Rodriguez et al. |
| 9,404,419 B2 | 8/2016 | Haillot |
| 9,458,770 B2 | 10/2016 | Anghel et al. |
| 9,937,803 B2 * | 4/2018 | Siegel .................... B64D 27/24 |
| 10,090,676 B2 * | 10/2018 | Knowles .................. H02J 3/00 |
| 10,093,428 B2 * | 10/2018 | Kupiszewski ......... B64D 27/24 |
| 2002/0195821 A1 | 12/2002 | Wacknov |
| 2007/0018035 A1 | 1/2007 | Saiz et al. |
| 2009/0302152 A1 | 12/2009 | Knight |
| 2013/0013222 A1 | 1/2013 | Gu et al. |
| 2013/0214597 A1 * | 8/2013 | Malo ........................ H02J 9/06 307/23 |
| 2014/0145028 A1 | 5/2014 | Gomez |
| 2014/0260306 A1 | 9/2014 | Dooley et al. |
| 2015/0089921 A1 | 4/2015 | Rideau et al. |
| 2015/0322864 A1 | 11/2015 | Dooley et al. |
| 2015/0345396 A1 | 12/2015 | Zelesky et al. |
| 2016/0046382 A1 * | 2/2016 | Alber .................... B64D 31/06 701/3 |
| 2016/0053690 A1 | 2/2016 | Perkinson et al. |
| 2016/0153326 A1 | 6/2016 | Muller et al. |
| 2016/0229513 A1 | 8/2016 | Scheel et al. |
| 2017/0170764 A1 | 6/2017 | Blackwelder et al. |
| 2018/0112599 A1 | 4/2018 | Dalal |

\* cited by examiner

DISTRIBUTED POWER GENERATION FOR A VEHICLE SYSTEM

FIELD

The present subject matter relates generally to distributed electrical power generation systems for aircraft, land, or sea vehicles.

BACKGROUND

Power generation systems for vehicles, such as aircraft, automotive vehicles, or marine ships generally include larger scale power generation systems, such as gas turbine engines or auxiliary power unit (APU) gas turbine engines, to provide electrical power throughout the vehicle. Conventionally, such power generation systems are sized and optimized to provide higher-efficiency electric energy from a single unit. For example, gas turbine engines for aircraft propulsion are generally sized and designed for a providing power at a maximum takeoff condition although the majority of the operation, mission, or cycle time generally is at a cruise condition defining a mid-power condition.

However, vehicles powered increasingly by electric or hybrid-electric power generation systems generally define operations or cycle times different from commercial aircraft or other conventional air, land, or sea vehicles. Such electric or hybrid-electric vehicles may more particularly define relatively short mid-power conditions, such as vertical takeoff and landing (VTOL) vehicles for air taxi purposes. As electric power, such as from APUs, motors, or generators, is increasingly needed for electric and hybrid electric vehicles, including increasingly smaller vehicles, there is a need for power generation systems that provide electric power distribution to such vehicles.

BRIEF DESCRIPTION

Aspects and advantages of the invention will be set forth in part in the following description, or may be obvious from the description, or may be learned through practice of the invention.

An aspect of the present disclosure is directed to a method for distributed power generation in a system. The method includes determining an operational cycle for the system; determining an average energy requirement of the system based on the operational cycle; configuring a plurality of energy sources each corresponding to the load device to produce a peak efficiency corresponding to the average energy requirement of the system; and coupling the energy source to provide energy to the load device.

In various embodiments, the method further includes distributing energy from the energy source to the load device. In one embodiment, distributing energy from the energy source to the load device includes distributing energy at the peak efficiency corresponding to the average energy requirement for the load device based on the operational cycle.

In still various embodiments, the method further includes determining a first operational cycle relative to a first load device; and determining a second operational cycle relative to a second load device. In one embodiment, the method further includes determining a first average energy requirement corresponding to the first operational cycle of the first load device; and determining a second average energy requirement corresponding to the second operational cycle of the second load device. In another embodiment, the method further includes configuring a first energy source to produce a first peak efficiency corresponding to the first average energy requirement; and configuring a second energy source to produce a second peak efficiency corresponding to the second average energy requirement. In still another embodiment, coupling the energy source to the load device includes coupling the first energy source to the first load device decoupled from the second energy source coupled to the second load device.

In one embodiment, the method further includes determining an overall power requirement of the system.

Another aspect of the present disclosure is directed to a system for power distribution in a vehicle. The system includes a first energy source coupled to a first load device. The first load device defines a first operational cycle, and the first energy source defines a peak efficiency corresponding to the first operational cycle of the first load device. The system further includes a second energy source coupled to a second load device. The second load device defines a second operational cycle, and the second energy source defines a peak efficiency corresponding to the second operational cycle of the second load device.

In one embodiment, the first energy source is coupled to the first load device electrically de-coupled from the second load device.

In various embodiments, the first load device and the second load device each comprise a propulsion system. In one embodiment, the first load device defines a first average power requirement specific to providing vertical liftoff and landing of the system correspond to a takeoff condition. In another embodiment, the second load device defines a second average power requirement specific to providing forward thrust of the system corresponding to a cruise condition.

In one embodiment, the first load device includes an average power requirement corresponding to between approximately 50% and approximately 85% of a maximum power requirement of the system. The system defines a maximum power requirement based at least on the sum of the plurality of load devices.

In various embodiments, the system further includes a third energy source coupled to a third load device. The third load device defines a third operational cycle, and the third energy source defines a peak efficiency corresponding to the third operational cycle of the third load device. In one embodiment, the third load device includes one or more of an avionics system or a cabin control system.

In still various embodiments, each load device is coupled to two or fewer energy sources. In one embodiment, the energy sources are coupled in serial arrangement to the load device. In another embodiment, the energy sources are coupled in parallel arrangement to the load device.

In one embodiment, the system includes one or more of a land-based vehicle, a sea-based vehicle, an aircraft, or an industrial system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of systems and methods for distributing power in a system are generally provided. The systems and methods shown and described herein generally provide improved power distribution within a land, sea, or air-based vehicle or industrial system. The system and methods generally provided include operating multiple motors, generators, capacitors (e.g., batteries, fuel cells, etc.), electric energy-producing turbine engines (e.g., auxiliary power units, or APUs, or gas generators), or electric machines generally (herein after, collectively referred to as "energy source") per load device. Load devices may include propulsion systems (e.g., fans, rotors, or propellers), wheels or tracks for a land-based vehicle, or other vehicle systems. Other vehicle systems may include electronics systems, computing devices, environmental control systems (ECS), thermal management systems (TMS), or any other electricity-consuming system to which energy from the energy source is provided.

The energy sources allocated to each load device are sized and located at the vehicle system for the specific operation of the load device. In contrast to conventional energy sources, such as APUs, in which the energy source is sized to provide high efficiency power for substantially all of a vehicle's overall power requirement (e.g., a relatively larger-sized energy source producing a higher efficiency to power substantially all load devices of a vehicle), the systems and methods generally provided herein include sizing multiple energy sources to provide electricity for only a portion of a vehicle's load devices. As such, the systems and methods provided herein may generally include a plurality of energy sources defining relatively lower peak efficiencies providing energy to a portion of a vehicle's load devices in contrast to a single, larger energy source defining a higher peak efficiency to provide energy to all of a vehicle's load devices.

Embodiments of the systems and methods generally provided herein include providing a plurality of relatively smaller-sized and lower efficiency energy sources for a portion of a vehicle's load devices. The systems and methods provided herein increase overall vehicle efficiency through overall vehicle weight reduction associated with the plurality of smaller, lesser peak-efficient energy sources. In one embodiment, such as an energy source defining a combustion engine, detonation engine, or gas generator generally (e.g., a turbine engine, such as an APU, or an internal combustion engine), the systems and methods generally provided herein may increase specific fuel consumption (SFC) at each energy source due to the decreased peak efficiency of the relatively smaller energy source while improving overall vehicle efficiency, such as due to decreased overall vehicle weight or localized placement of energy sources to the load devices to which energy is provided.

In still various embodiments, the systems and methods generally provided herein include providing a plurality of relatively smaller sized and lower efficiency energy sources for a portion of a vehicle's load devices in contrast to a vehicle including a plurality of conventional energy sources defining substantially the same, higher-efficiency peak power output across multiple locations. For example, the plurality of conventional energy sources may include a motor or generator at each propulsion gas turbine engine generally defining the same size and efficiency in a multiple-engine aircraft, and each motor/generator is sized to be capable of providing energy to substantially all load devices of the vehicle.

In various embodiments, the energy sources are dedicated to specific load devices of the vehicle system. In one embodiment, one to four energy sources are dedicated to each load device. In another embodiment, one to two energy sources are dedicated to each load device.

Still various embodiments of the systems and methods generally provided herein enable power cycling (e.g., on/off operation) of one or more distributed energy sources depending on the commanded power requirement of the system. Such cycling may be based on changes in vehicle system operation. For example, where the vehicle system defines an aircraft, cycling may be based on changes in the landing/takeoff cycle, such as to produce maximum power output at a takeoff condition and an intermediate power output at a cruise or approach condition. As another example, wherein the vehicle system defines a land-based vehicle, cycling may be based on changes in horsepower or torque requirement. Cycling may further be based on power output necessary at one or more wheels, gears, or tracks of the land-based vehicle system.

Figure 1:
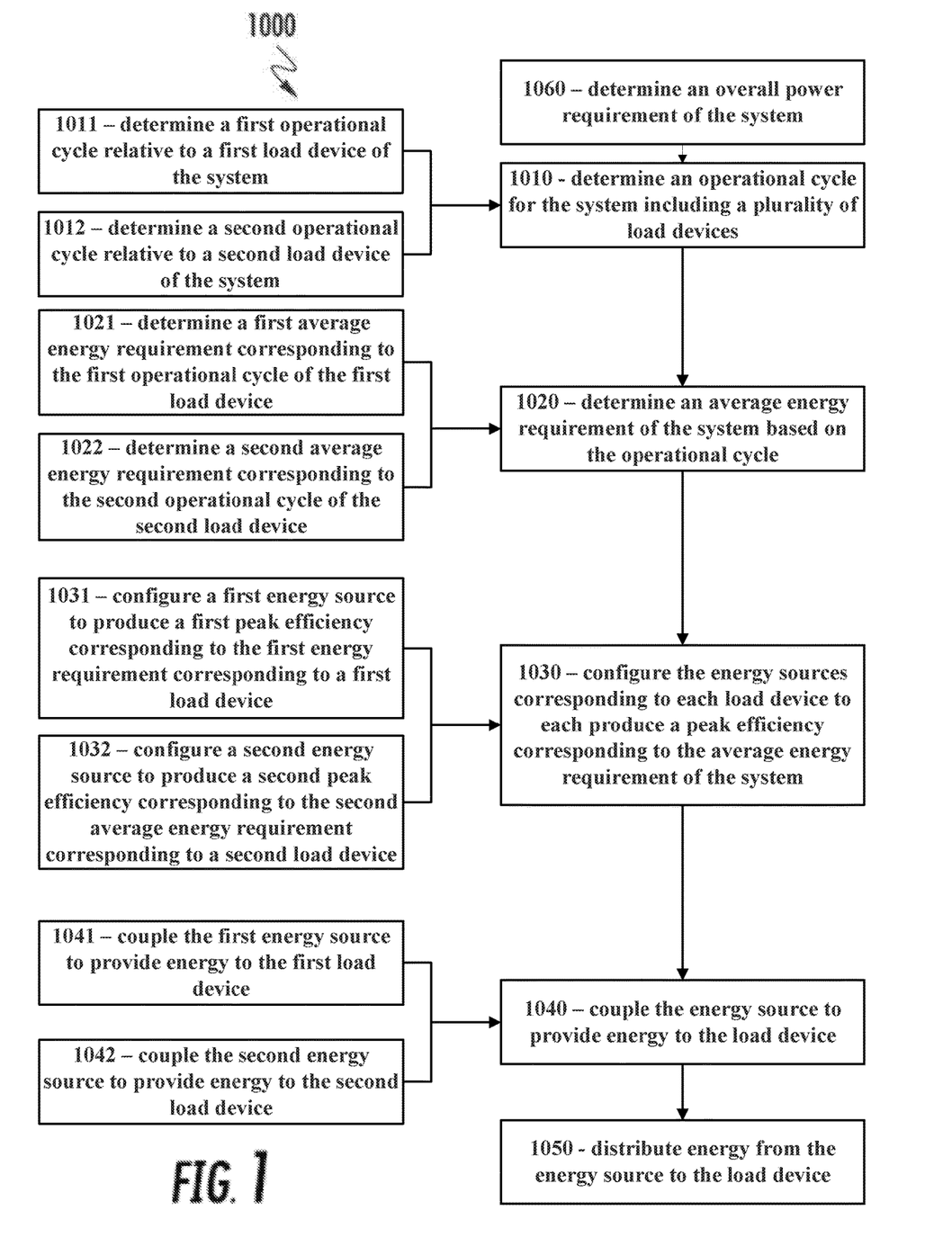
FIG. 1 is a flowchart outlining exemplary steps of a method for power distribution in a system.

Referring to FIG. 1, an exemplary flowchart outlining steps of a method for providing electric energy to a plurality of load devices at a vehicle (hereinafter, "method 1000") is generally provided. The method 1000 generally provided in FIG. 1 is generally understood such as further shown and described herein relative to FIGS. 2-7. However, it should be appreciated that although FIGS. 2-7 depict certain or particular embodiments of vehicles and systems, it should be appreciated that the method 1000 may be applied, altered, utilized in whole or in part, or re-arranged without deviating from the scope of the disclosure.

Figure 2:
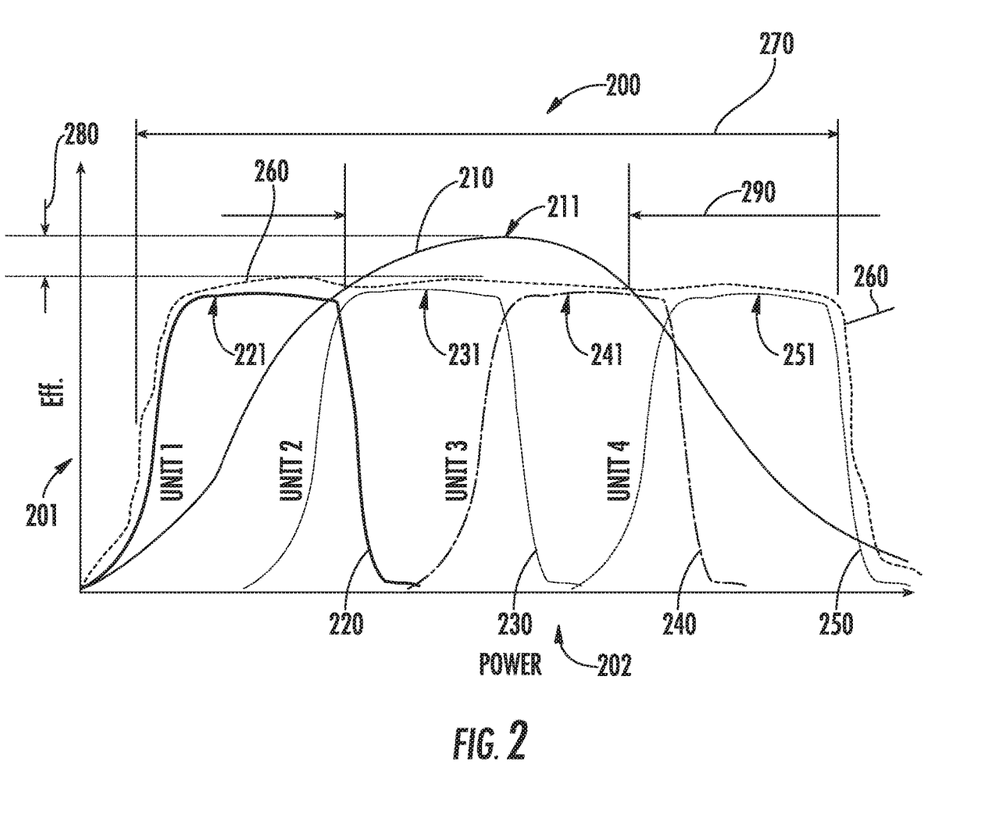
FIGS. 2-3 are graphs depicting exemplary efficiency versus power curves for a system implementing the method of FIG. 1.

The method 1000 includes at 1010 determining an operational cycle for the system including a plurality of load devices. The operational cycle includes a preferred or primary operational mode of the system including the plurality of load devices. For example, in one embodiment, the load device may define a propulsion unit for a vehicle (e.g., a fan, rotor or other propulsion device for a vehicle). The vehicle system may include a plurality of load devices defining a plurality of propulsion or locomotive units. The system may further include a plurality of load devices defining any combination of power-consuming devices. The system may define an operational cycle in which the system commands power to operate primarily at a cruise condition within the landing-takeoff cycle. For example, the system may define the operational cycle in which the plurality of load devices operates substantially within approximately 50% to approximately 85% of an overall power requirement for propelling the vehicle system (e.g., approximately 50% to approximately 85% of a takeoff power requirement), such as depicted at FIG. 2 at 290.

As another example, the system may define the operational cycle in which the plurality of load devices operates substantially within approximately 50% to approximately 85% of a maximum horsepower or torque requirement for operating the vehicle system (e.g., approximately 50% to approximately 85% of a desired peak power requirement for the vehicle).

In still various embodiments, the system may define the operational cycle in which the load device(s) operate substantially within approximately 60% to approximately 75% of the maximum or peak power requirement for the vehicle system. For example, such as further depicted in regard to FIG. 2, the system defines an overall or maximum power requirement for operating the system. Operation of the system may include propulsion or movement, supplying power for environmental control system or thermal management systems generally, control systems or computing devices generally, or auxiliary systems, or other power consuming devices at the vehicle system.

The method 1000 further includes at 1020 determining an average energy requirement of the system based on the operational cycle. The average energy requirement of the system may be based at least in part on a period of time at which an operator (e.g., pilot, controller, etc.) commands a desired operation from the load device. For example, in an embodiment in which the vehicle defines a landing-takeoff cycle (e.g., taxi, takeoff, climb, cruise, approach, landing, thrust reverse), the average energy requirement of the system may be based on the largest period of time at which the operator commands the desired operation from the system. For example, relative to the landing-takeoff cycle, the vehicle system defining an aircraft may operate primarily at a cruise condition. The cruise condition may include one or more load devices providing power to ECS or TMS systems, avionics and computing devices, or interior and auxiliary systems generally. The cruise condition may further include one or more propulsion units, such as a thrust or lift fan, providing movement to the vehicle system following takeoff from rest or before landing.

It should be appreciated that the step at 1020 may further include determining an average energy requirement of the system based on the operational cycle in which one or more load devices augments performance or operation of the vehicle system. Stated alternatively, determining the average energy requirement of the system is specific to an operational cycle for the load device to which an energy source is coupled to provide energy. For example, the average energy requirement may be based at least on the load device utilized primarily for providing energy required for takeoff (e.g., the load device providing the energy necessary for the vehicle to operate at the maximum energy requirement in conjunction with other load devices). As such, relative to the landing-takeoff cycle, the average energy requirement of the load device may correspond to the takeoff or maximum energy requirement of the vehicle. For example, the load device may be dedicated to providing energy substantially only when the maximum energy requirement for the vehicle is commanded by the operator. Therefore, it should be appreciated that such a load device may require an average energy requirement substantially corresponding to the difference between the cruise condition and the takeoff condition.

It should further be appreciated that although reference is made to the landing-take off cycle, including a cruise condition and a takeoff condition, the takeoff condition may generally refer to a maximum power requirement and the cruise condition may generally refer to any one or more intermediate power requirements less than the maximum power requirement and greater than zero.

The method 1000 further includes at 1030 configuring the energy sources corresponding to each load device to each produce a peak efficiency corresponding to the average energy requirement of the system. For example, referring to FIGS. 2-3, exemplary graphs 200, 300 depicting an efficiency versus power curve for a system (e.g., vehicle) are generally provided. Efficiency, depicted at axis 201, is relative to the energy source. Power, depicted at axis 202, is relative to the overall power requirement of the vehicle.

Conventionally, the vehicle includes a single energy source configured to provide substantially all of the overall power requirement of the system, such as depicted at curve 210 along the length of the power axis 202. The conventional single energy source further defines a peak efficiency (e.g., at 211) based on the single energy source providing substantially all of the overall power requirement of the system. Although the conventional single energy source is configured to provide substantially all of the overall power requirement of the system, the system generally defines an average power requirement within a subset or range of the overall power requirement, such as depicted within range 290 (FIG. 2). It should be understood that although a vehicle system may include a plurality of such a single energy source, each energy source is generally configured to provide substantially all of overall power requirement such as depicted at curve 210 (e.g., a motor/generator attached to a gas turbine engine propulsion system of the aircraft).

The method 1000 provides a plurality of energy sources at the vehicle system in which each energy source provides a portion of the overall power requirement of the system, such as depicted at curve 220, 230, 240, 250. The plurality of energy sources depicted by each curve 220, 230, 240, 250 collectively provide a distributed power generation across the power axis 202, such as depicted at 270. The distributed power generation at the system enables a net operational system efficiency such as exemplified at line 260. Referring to FIG. 2, the net operational efficiency of the distributed power generation system depicted at curve 260 versus efficiency of a conventional single energy source depicted at curve 210 may define a difference in efficiency due to differences in size of a single, higher-efficiency, higher-power output energy source (depicted via curve 210) versus a plurality of lower-power output energy sources providing distributed power generation (depicted via curves 220, 230, 240, 250), the difference of which is depicted at 280. In the exemplary embodiment of the graph 200, 300 depicted in FIGS. 2-3, respectively, four energy sources (represented each by curves 220, 230, 240, and 250) are utilized to provide the overall power requirement to the vehicle.

Figure 3:
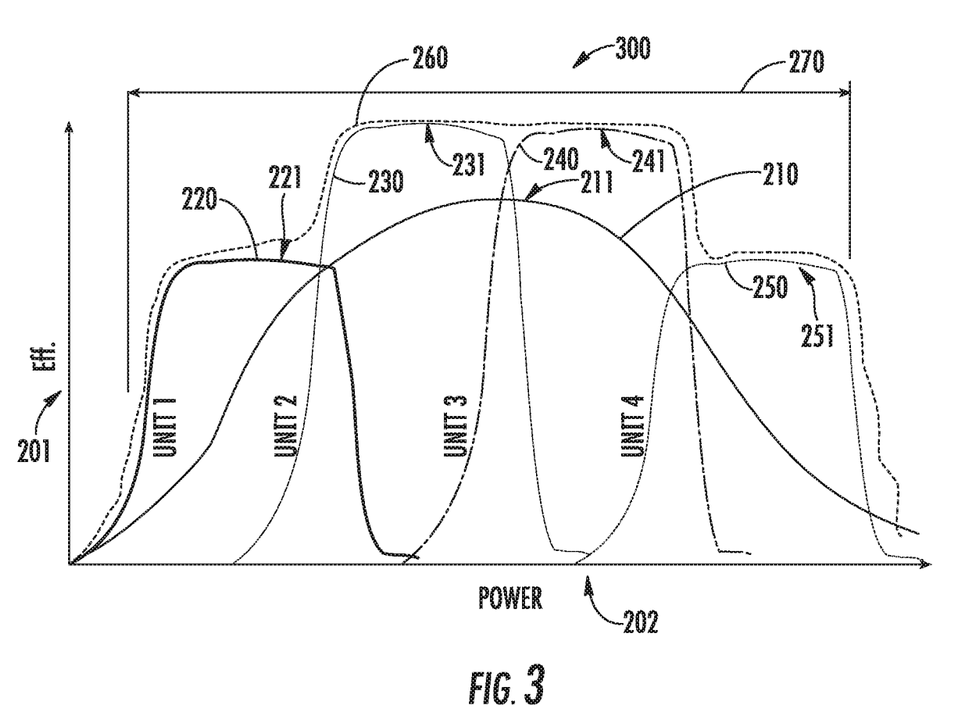

It should be appreciated that the quantity of energy sources (represented by each curve 220, 230, 240, 250) may differ based on the quantity of load devices at the system. As such, in various embodiments as described herein, the system may include one or more energy sources dedicated to each load device. Still further, the graph 200, 300 may depict a vehicle system including a single load device powered by four energy sources (represented by curves 220, 230, 240, 250). Alternatively, the graph 200, 300 may depict a vehicle system including two to four load devices powered by one or more energy sources corresponding to each load device. For example, the graph 200, 300 may depict a vehicle system including between a 1:1 ratio of energy sources to load devices (i.e., depicting four load devices coupled to four energy sources) to a 4:1 ratio of energy sources to load devices (e.g., depicting four or fewer load devices coupled to one energy source, with any difference fewer from four load devices being coupled to one or more remaining energy sources). Furthermore, it should be appreciated that although the graph 200, 300 depicts four curves (220, 230, 240, 250), additional curves may be depicted, each representing additional energy sources.

Referring to FIG. 2, in one embodiment, each energy source defines a substantially similar efficiency versus power curve 220, 230, 240, 250. In other words, each energy source may provide energy to their respective load devices in which each energy source (depicted via curves 220, 230, 240, 250) defines a substantially similar efficiency versus power relative to one another.

Referring to FIG. 3, in another embodiment, two or more energy sources may define efficiency versus power curves different from one another. For example, in the exemplary embodiment generally provided in FIG. 3, energy sources represented by curves 230, 240, and corresponding peak efficiencies 231, 241, depict different efficiency versus power curves from those energy sources represented by curves 220, 250, and corresponding peak efficiencies 221, 251. For example, in the embodiment generally provided, energy sources represented by curves 230, 240 are configured to produce peak power at a higher peak efficiency than a vehicle including a conventional energy source represented by curve 210 and different from energy sources represented by curves 220, 250 configured to produce peak power at a lower peak efficiency than the vehicle including the conventional energy source represented by curve 210.

Referring back to FIG. 1, in another exemplary embodiment, the method 1000 includes at 1011 determining a first operational cycle relative to a first load device of the system, and at 1012 determining a second operational cycle relative to a second load device of the system, each such as described in regard to step 1010. As generally described herein, in one embodiment, the first operational cycle may be similar to the second operational cycle, such as depicted in regard to FIG. 2. However, in another embodiment, the first operational cycle may be different from the second operational cycle, such as depicted in regard to FIG. 3.

It should be appreciated that in various embodiments, the method 1000, such as at 1010, 1011, and 1012, includes determining an operational cycle relative to each load device to which one or more energy sources provides energy to the load device of the system. For example, the method 1000 at 1011 generally includes determining a first operational cycle relative to a first load device coupled to a first energy source (or a dedicated plurality of energy sources) separate from the method 1000 at 1012 at which a second operational cycle is determined relative to a second load device coupled to a second energy source (or dedicated plurality of energy sources).

In still another exemplary embodiment, the method 1000 includes at 1021 determining a first average energy requirement corresponding to the first operational cycle of the first load device, and at 1022 determining a second average energy requirement corresponding to the second operational cycle of the second load device, each such as described in regard to step 1020. As generally described herein, in one embodiment, the first average energy requirement may be similar to the second average energy requirement, such as depicted in regard to FIG. 2 via the curve 220, 230, 240, 250 extended along the power axis 202. However, in another embodiment, the first average energy requirement may be different from the second average energy requirement, such as depicted in regard to FIG. 3 via the curve 220, 250 extended along the power axis 202 different from the curve 230, 240.

In still another exemplary embodiment, the method 1000 includes at 1031 configuring a first energy source to produce a first peak efficiency corresponding to the first energy requirement corresponding to a first load device, and at 1032 configuring a second energy source to produce a second peak efficiency corresponding to the second average energy requirement corresponding to a second load device, such as described in regard to step 1030.

The method 1000 may further include at 1040 coupling (e.g., electrically coupling) the energy source to provide energy to the load device. The method 1000 may further include at 1041 coupling the first energy source to provide energy to the first load device, and at 1042 coupling the second energy source to provide energy to the second load device. As described herein, in various embodiments, the first energy source may include a plurality of first energy source coupled to the first load device. Additionally, or alternatively, the second energy source may include a plurality of second energy source coupled to the second load device.

In still various embodiments, the first energy source electrically coupled to the first load device is electrically de-coupled from the second load device and the second energy source electrically coupled to the second load device is electrically de-coupled from the first load device. For example, the first energy source is dedicated to the first load device and the second energy source is dedicated to the second load device.

Referring still to FIG. 1, in yet another embodiment, the method 1000 may include at 1050 distributing energy from the energy source to the load device. The method 1000 at 1050 may include distributing energy at the peak efficiency corresponding to the average energy requirement for the system based on the operational cycle of the plurality of load devices.

Figure 4:
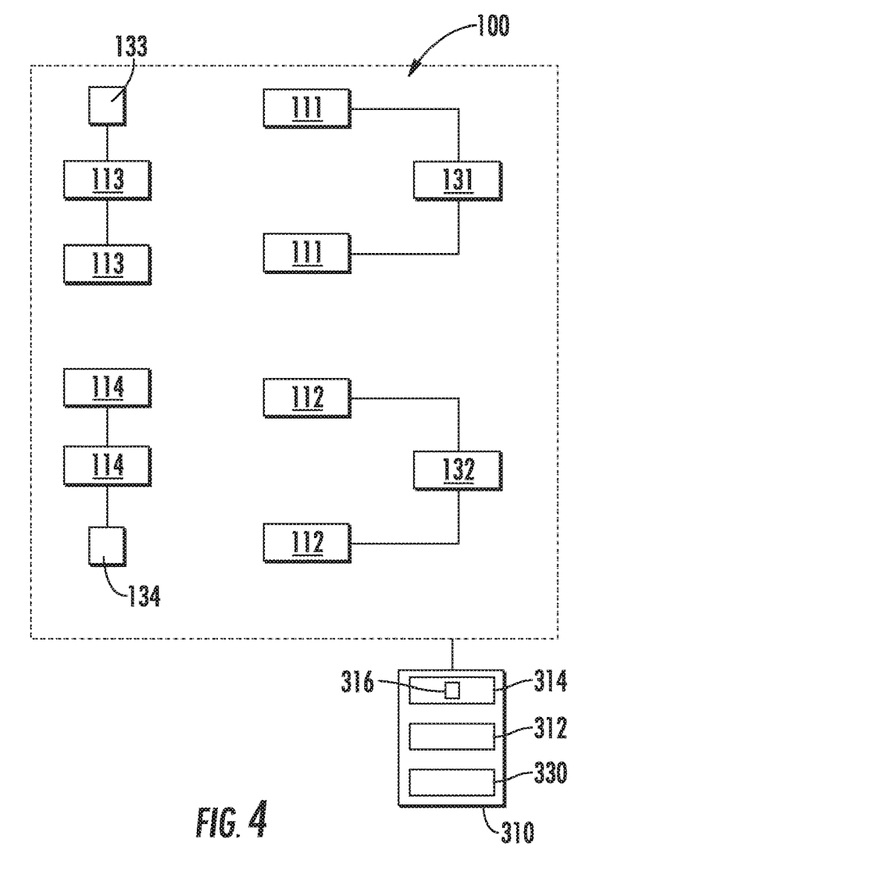
FIGS. 4-7 are exemplary embodiments of systems for power distribution according to aspects of the present disclosure.

Referring now to FIG. 4, an exemplary schematic embodiment of a system 100 for distributing electrical energy to a plurality of load devices is generally provided. The system 100 includes an overall power requirement such as depicted along the power axis 202 in FIGS. 2-3. The overall power requirement for the system 100 is the sum of the power requirements for each load device 131, 132, 133, 134 in the system 100. It should be appreciated that each load device 131, 132, 133, 134 defines an average power requirement specific to each load device. In one embodiment, each load device 131, 132, 133, 134 may generally define each average power requirement as substantially equal such as depicted in regard to FIG. 2. In another embodiment, two or more load devices may define different average power requirements.

The system 100 includes a first energy source 111 coupled to a first load device 131 and a second energy source 112 coupled to a second load device 132, such as described herein and in regard to method 1000. The first energy source 111 may define an efficiency versus power curve such as shown and described in regard to curve 220 (FIGS. 2-3). The second energy source 112 may define an efficiency versus power curve such as shown and described in regard to curve 230 (FIGS. 2-3).

The exemplary embodiment of the system 100 depicted in regard to FIG. 4 may further include a third energy source 113 coupled to a third load device 133 and a fourth energy source 114 coupled to a fourth load device 134, such as described herein in regard to method 1000. The third energy source 113 and the fourth energy source 114 may each define an efficiency versus power curve such as shown and described in regard to curve 240 and curve 250, respectively (FIGS. 2-3).

In various embodiments of the system 100 and method 1000 described herein, the load device may be coupled to a plurality of energy sources in parallel arrangement, such as depicted in regard to the first energy source(s) coupled to the first load device 131 and the second energy source(s) coupled to the second load device 132. In other embodiments, the load device may be coupled to a plurality of energy sources in serial arrangement, such as depicted in regard to the third energy source(s) coupled to the third load device 133 and the fourth energy source(s) coupled to the fourth load device 134.

In still another embodiment, the method 1000 may include at 1060 determining an overall power requirement of the system, such as depicted along the length of the power axis 202 at graphs 200, 300 in FIGS. 2-3. As described herein, the overall power requirement of the system may include the overall power requirement to one or more load devices propelling the system defining vehicle (e.g., an aircraft, landcraft, or seacraft), one or more load devices to provide energy for environmental or thermal control systems, computing devices, auxiliary systems, or other subsystems of the vehicle system. Embodiments of distributed power generation to a plurality of load devices of a vehicle system such as described in regard to FIGS. 1-3 are generally provided in regard to FIGS. 4-7.

Figure 5:
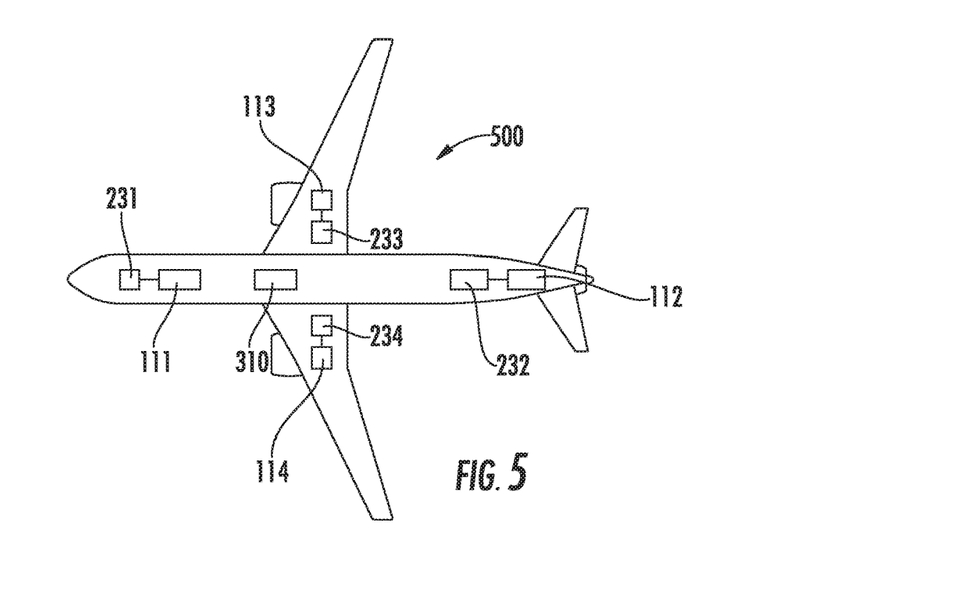

Referring now to FIG. 5, a top-down schematic view of an embodiment of a system 500 defining an aircraft is generally provided. The system 500 defining the aircraft includes an overall power requirement such as shown and described in regard to graph 200, 300 in FIGS. 2-3, respectively, along the power axis 202. The system 500 defining the aircraft includes a plurality of load devices each coupled to respectively dedicated energy sources, such as described in regard to method 1000 (FIG. 1), graph 200, 300 at curves 220, 230, 240, 250 (FIGS. 2-3), or shown and described in regard to various embodiments of the system 100 in regard to FIG. 4.

The system 500 depicted in FIG. 5 includes a plurality of load devices such as shown and described in regard to load devices 131, 132, 133, 134 in FIG. 4. In one embodiment, the system 500 includes a first load device defining 231 defining an avionics system and other cockpit load devices. The first load device 231 is coupled to a first energy source 111 such as shown and described in regard to FIGS. 1-4. In another embodiment, the system 100 includes a second load device 232 defining a cabin electrical system and other cabin load devices. The second load device 232 is coupled to a second energy source 112 such as shown and described in regard to FIGS. 1-4. In still another embodiment, the system 100 includes a third load device 233 and a fourth load device 234 each defining one or more of an environmental control system (ECS), a thermal management system (TMS), or other aircraft systems.

It should be appreciated that the energy sources depicted, or additional dedicated energy sources, may be coupled to additional load devices, or subsets of those generally depicted herein, according to various embodiments of the method 1000 and system 100 described herein. The system 500 generally includes providing energy sources positioned closely to the load device and to operate the energy source nearer to the peak efficiency of the specific energy source dedicated to the load device.

Figure 6:
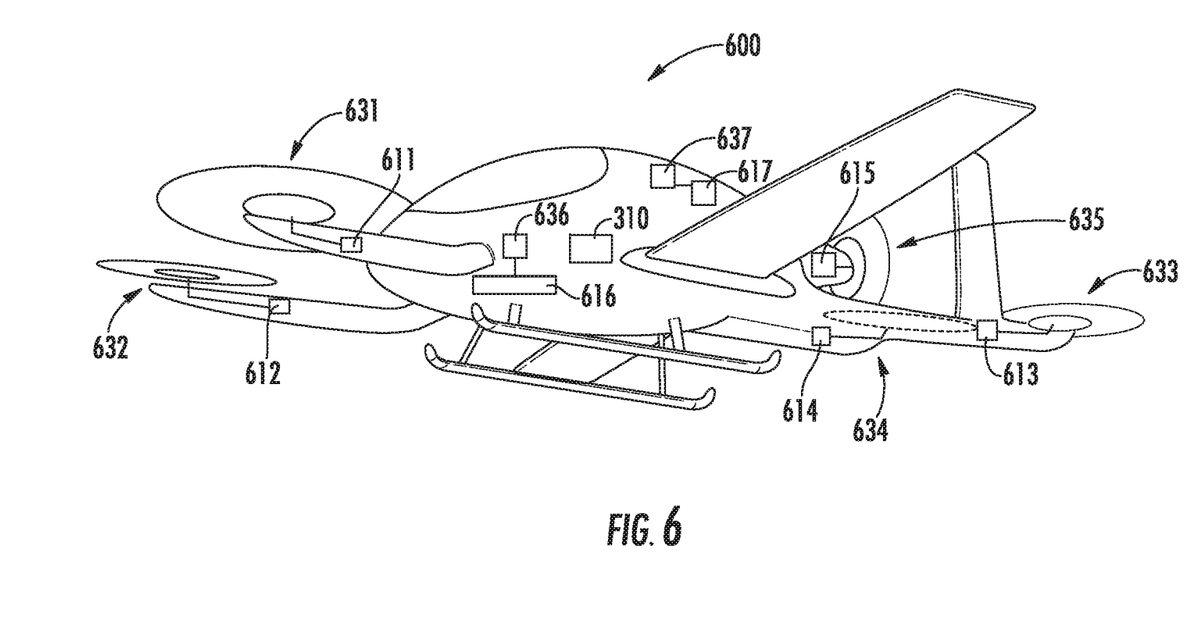

Referring now to FIG. 6, another exemplary embodiment of a system 600 defining a vertical takeoff and landing (VTOL) aircraft is generally provided. The system 600 is configured substantially similarly as described in regard to method 1000 (FIG. 1), the graph 200, 300 (FIGS. 2-3), and various embodiments of the system 100, 500 shown and described in regard to FIGS. 4-5.

The system 600 generally depicting a VTOL vehicle may include a plurality of load devices 631, 632, 633, 634, 635 each defining a propulsion device providing thrust, lift, or other locomotion of the system 600 defining a VTOL vehicle. For example, load devices 631, 632, 633, 634 may each define separately controllable vertical lift rotors or rotary wings. Each load device 631, 632, 633, 634 is separately coupled to a dedicated energy source 611, 612, 613, 614, such as described in regard to the load devices and energy sources regarding FIGS. 4-5. The load devices 631, 632, 633, 634 may generally provide an initial lift or takeoff of the system 600. For example, the energy sources each respectively coupled to each load device 611, 612, 613, 614 may define average power requirements specific to providing initial vertical liftoff and/or landing of the system 600. The system 600 may further include a load device 635 defining a propulsion rotor or fan coupled to a dedicated energy source 615 defining an average power requirement specific to providing forward thrust or movement of the system 600. For example, the load device 635 defining the propulsion rotor or fan may include the energy source defining the average power requirement corresponding to a substantially steady state velocity or cruise speed of the system 600 following initial vertical liftoff and prior to approach and landing.

In one embodiment, the energy source(s) 611, 612, 613, 614 respectively coupled to each load device 631, 632, 633, 634 may each define an average power requirement corresponding to the power requirement for liftoff and landing of the system 600 (e.g., a maximum power requirement of the system 600).

In another embodiment, the energy source(s) 615 coupled to the load device 635 may define an average power requirement corresponding to between approximately 50% and approximately 85% of the maximum power requirement of the system 600, such as corresponding to a substantially steady state velocity or cruise speed of the system.

In still another embodiment, the system 600 may include load device 636 coupled to energy source 616, in which the load device 636 defines an avionics system or other flight control system. In still yet another embodiment, the system 600 may include load device 637 coupled to energy source 617, in which the load device 637 defines a cabin control system (e.g., lighting, ECS, TMS, etc.).

Figure 7:
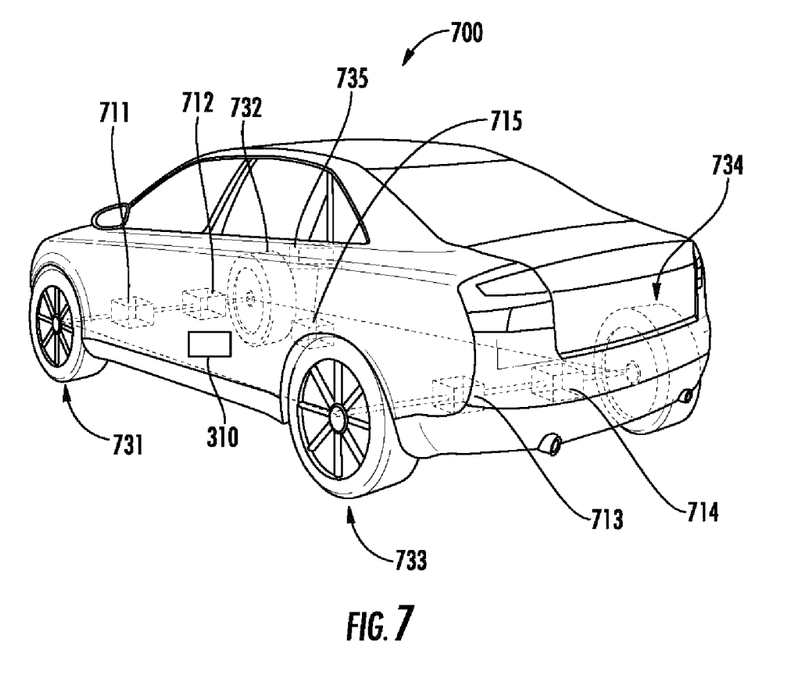

Referring now to FIG. 7, another exemplary embodiment of a system 700 defining a land-based vehicle is generally provided. The system 700 is configured substantially similarly as described in regard to method 1000 (FIG. 1), the graph 200, 300 (FIGS. 2-3), and various embodiments of the system 100, 500, 600 shown and described in regard to FIGS. 4-6.

The system 700 generally depicting a land-based vehicle may include a plurality of load devices 731, 732, 733, 734 each operating a wheel (or in other embodiments, a track or worm gear, etc.) providing locomotion of the system 700 defining a land-based vehicle. For example, load devices 731, 732, 733, 734 may each define separately controllable wheels such as to distribute power independently of one another. Each load device 731, 732, 733, 734, 735 is separately coupled to a dedicated energy source 711, 712, 713, 714, 715 such as described in regard to the load devices and energy sources regarding FIGS. 4-6. The energy sources 711, 712 respectively coupled to the load devices 731, 732 defining front wheels may each define average power requirements different from the energy sources 713, 714 respectively coupled to load devices 733, 734 defining rear wheels.

In still other embodiments not depicted herein, the systems and methods generally described herein may be applied to vehicles defining other land craft, sea craft, or aircraft, such as, but not limited to, rotary wing vehicles, amphibious vehicles, ships, boats, or trains, or industrial systems. Still various embodiments of the systems 100 and methods 1000 generally provided herein may provide improved flexibility for types of missions or modes of operation, such as for vehicles with variable or undefined missions, or for vehicles defining substantially different modes of operation, such as short and long term operations, cruise or idle periods, or substantial changes in payload weight (e.g., cargo, freighter, delivery applications, weapons deployment systems, fuel delivery systems, etc.). Still further embodiments may enable two or more vehicles each defining two or more different mission or operational profiles or power output levels to use a similar energy source in fewer or greater quantities for the plurality of load devices for each vehicle.

In various embodiments, the system 100, 500, 600, 700 further includes a controller 310 configured to perform operations, such as one or more steps shown and described in regard to method 1000 and embodiments of the system 100, 500, 600, 700 in regard to FIGS. 1-7. The controller 310 can correspond to any suitable processor-based device, including one or more computing devices. For instance, FIG. 4 illustrates one embodiment of suitable components that can be included within the controller 310. As shown in FIG. 4, the controller 310 can include a processor 312 and associated memory 314 configured to perform a variety of computer-implemented functions. In various embodiments, the controller 310 may be configured to determine or store one or more operational cycles for the system, determine one or more average energy requirements of the system based on the one or more operational cycles, and setting, adjusting, modulating, or otherwise configuring the plurality of energy sources to each produce a peak efficiency each corresponding to the average energy requirement of the system based on respective operational cycles of the load devices, such as described in regard to method 1000. The controller 310 may further be configured to store one or more curves 210, 220, 230, 240, 250 such as depicted in regard to FIGS. 2-3, and utilize such as described in regard to FIGS. 1-7.

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 314 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 310 may define one or more of a full authority digital engine controller (FADEC), a propeller control unit (PCU), an engine control unit (ECU), or an electronic engine control (EEC).

As shown, the controller 310 may include control logic 316 stored in memory 314. The control logic 316 may include instructions that when executed by the one or more processors 312 cause the one or more processors 312 to perform operations, such as one or more steps shown and described in regard to method 1000 and FIGS. 1-7. The memory 314 may further store the curves such as depicted in regard to FIGS. 2-3.

Additionally, as shown in FIG. 1, the controller 310 may also include a communications interface module 330. In various embodiments, the communications interface module 330 can include associated electronic circuitry that is used to send and receive data. As such, the communications interface module 330 of the controller 310 can be used to receive data from the load devices, energy sources, or operational parameters from the system 100, 500, 600, 700. The communications interface module 330 may receive and send data from a sensor corresponding to operational parameters or other suitable components of the system 100, 500, 600, 700, such as temperatures, thrust, torque, or other power outputs, load rates and changes, charging levels, periods of usage (e.g., accumulated minutes, hours, cycles, etc.), or other operational parameters at the system including the load devices and energy sources such as described herein.

It should be appreciated that the communications interface module 330 can be any combination of suitable wired and/or wireless communications interfaces and, thus, can be communicatively coupled to one or more components of the engine 10 via a wired and/or wireless connection. As such, the controller 310 may communicate with one or more sensors to determine or monitor one or more operational cycles for the system and one or more average energy requirements of the system based on the one or more operational cycles, and calculating, commanding, executing, or otherwise configuring the plurality of energy sources to each produce a peak efficiency corresponding to the average energy requirement of the system.

It should further be appreciated that in various embodiments the controller 310, or portions thereof, may be coupled to the system 100, 500, 600, 700, such as attached physically thereto or otherwise locally to the system (e.g., mounted to the system). In other embodiments, the controller 310, or portions thereof, may be communicatively coupled and physically attached to another system, or a satellite communications system (e.g., airborne, spaceborne, etc.) or ground-based communications system (e.g., land or sea-based), such as to determine one or more steps of the method 100 and wirelessly communicate the instructions and operations to the system 100, 500, 600, 700.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for distributed power generation in a system, the method comprising:
   determining an operational cycle for the system comprising
      determining a first operational cycle relative to a first load device and determining
      a second operational cycle relative to a second load device;
   determining an average energy requirement of the system based on the operational cycle;
   configuring a plurality of energy sources corresponding to each of the first load device and the second load device to produce a peak efficiency corresponding to the average energy requirement of the system; and
   coupling the plurality of energy sources to provide energy to the first and second load devices.

2. The method of claim 1, further comprising:
   distributing energy from the plurality of energy sources to the first and second load devices.

3. The method of claim 2, wherein distributing energy from the plurality of energy sources to the first and second load devices includes distributing energy at the peak efficiency corresponding to the average energy requirement for the system based on the first and second operational cycles.

4. The method of claim 1, wherein the first load device comprises an average power requirement between 50% and 85% of a maximum power requirement of the system.

5. The method of claim 1, further comprising:
   determining a first average energy requirement corresponding to the first operational cycle of the first load device; and
   determining a second average energy requirement corresponding to the second operational cycle of the second load device.

6. The method of claim 5, further comprising:
   configuring a first energy source of the plurality of energy sources to produce a first peak efficiency corresponding to the first average energy requirement; and
   configuring a second energy source of the plurality of energy sources to produce a second peak efficiency corresponding to the second average energy requirement.

7. The method of claim 6, wherein coupling the plurality of energy sources to the first and second load devices includes coupling the first energy source of the plurality of energy sources to the first load device, the first load device decoupled from the second energy source of the plurality of energy sources, the second energy source of the plurality of energy sources coupled to the second load device.

8. The method of claim 1, further comprising:
   determining an overall power requirement of the system.

9. A system for power distribution in a vehicle, the system comprising:
   a first energy source coupled to a first load device, wherein the first load device defines a first operational cycle, and wherein the first energy source defines a peak efficiency corresponding to the first operational cycle of the first load device; and
   a second energy source coupled to a second load device, wherein the second load device defines a second operational cycle, and wherein the second energy source defines a peak efficiency corresponding to the second operational cycle of the second load device;
   wherein the first energy source and the second energy source are each configured to produce a peak efficiency corresponding to an average energy requirement of the system based on an overall power requirement of the system;
   wherein the first load device and the second load device each comprise a propulsion system; and
   wherein the second load device defines a second average power requirement specific to providing forward thrust of the system corresponding to a cruise condition.

10. The system of claim 9, wherein the first energy source is coupled to the first load device, the first energy source being electrically de-coupled from the second load device.

11. The system of claim 9, further comprising:
    a third energy source coupled to a third load device, wherein the third load device defines a third operational cycle, and wherein the third energy source defines a peak efficiency corresponding to the third operational cycle of the third load device.

12. The system of claim 9, wherein the first load device defines a first average power requirement specific to providing vertical liftoff and landing of the system corresponding to a takeoff condition.

13. The system of claim 11, wherein the third load device comprises one or more of an avionics system or a cabin control system.

14. The system of claim 9, wherein the first load device comprises a first average power requirement between 50% and 85% of a maximum power requirement of the system, wherein the system defines the maximum power requirement based at least on a sum of the first and second average power requirements of the first and second load devices.

15. A system for power distribution in a vehicle, the system comprising:
    a first energy source coupled to a first load device, wherein the first load device defines a first operational cycle, and wherein the first energy source defines a peak efficiency corresponding to the first operational cycle of the first load device;
    a second energy source coupled to a second load device, wherein the second load device defines a second operational cycle, and wherein the second energy source defines a peak efficiency corresponding to the second operational cycle of the second load device; and
    a third energy source coupled to a third load device, wherein the third load device defines a third operational cycle, and wherein the third energy source defines a peak efficiency corresponding to the third operational cycle of the third load device; and
    wherein the first energy source and the second energy source are each configured to produce a peak efficiency corresponding to an average energy requirement of the system based on an overall power requirement of the system.

16. The system of claim 15, wherein the third load device comprises one or more of an avionics system or a cabin control system.

17. The system of claim 9, wherein each of the first and second load devices is coupled to two or fewer of the first and second energy sources.

18. The system of claim 17, wherein the first and second energy sources are coupled in a serial arrangement to the first and second load devices.

19. The system of claim 17, wherein the first and second energy sources are coupled in a parallel arrangement to the first and second load devices.

20. The system of claim 9, wherein the vehicle comprises one or more of a land-based vehicle, a sea-based vehicle, or an aircraft.

* * * * *